March 26, 1929.  W. L. HANCOCK  1,706,663
COTTON PRESS DOOR MECHANISM
Filed April 30, 1928  3 Sheets-Sheet 2

March 26, 1929. W. L. HANCOCK 1,706,663
COTTON PRESS DOOR MECHANISM
Filed April 30, 1928  3 Sheets-Sheet 3

Inventor
W. L. Hancock
By Jack N. Ashby
Attorney

Patented Mar. 26, 1929.

1,706,663

UNITED STATES PATENT OFFICE.

WILLIAM L. HANCOCK, OF DALLAS, TEXAS, ASSIGNOR TO THE MURRAY COMPANY, OF DALLAS, TEXAS, A CORPORATION OF TEXAS.

COTTON-PRESS-DOOR MECHANISM.

Application filed April 30, 1928. Serial No. 274,030.

This invention relates to new and useful improvements in cotton press door mechanism.

One object of the invention is to provide a dual door fastening mechanism including an efficient latch device for securing the doors in their closed position while the press box is being loaded and the cotton tamped therein, and also while the box is being swung to its position under the top platen; together with means for clamping the upper ends of the side doors and releasing the latch device, whereby the said doors are securely held against the force of the lateral expansion of the forming cotton bale, and also whereby more substantial structure than the latch device is brought into use to withstand the pressure of the pressing action.

A further object of the invention is to provide a door clamping mechanism carried by the press frame at the top platen, so as to lend greater stability and also to center the press box under said platen.

Another object of the invention is to provide automatic means for holding said latch device in its unlatched position so that said device will not interfere with the opening of the doors when the clamping mechanism is withdrawn.

A still further object of the invention is to provide a retaining means for the dog actuating lever, whereby the latter is held against displacement until the latch device is released.

An important object of the invention is to provide an overhead door clamping means which will be entirely free from the end doors of the box and which will be compact and out of the way, as well as simple in construction and comprising a few parts.

Still another object of the invention is to provide a locking device for the clamping means for preventing displacement of the latter when it is engaged with the side doors of the press box.

A construction designed to carry out the invention will be hereinafter described, together with other features of the invention.

Figure 1:
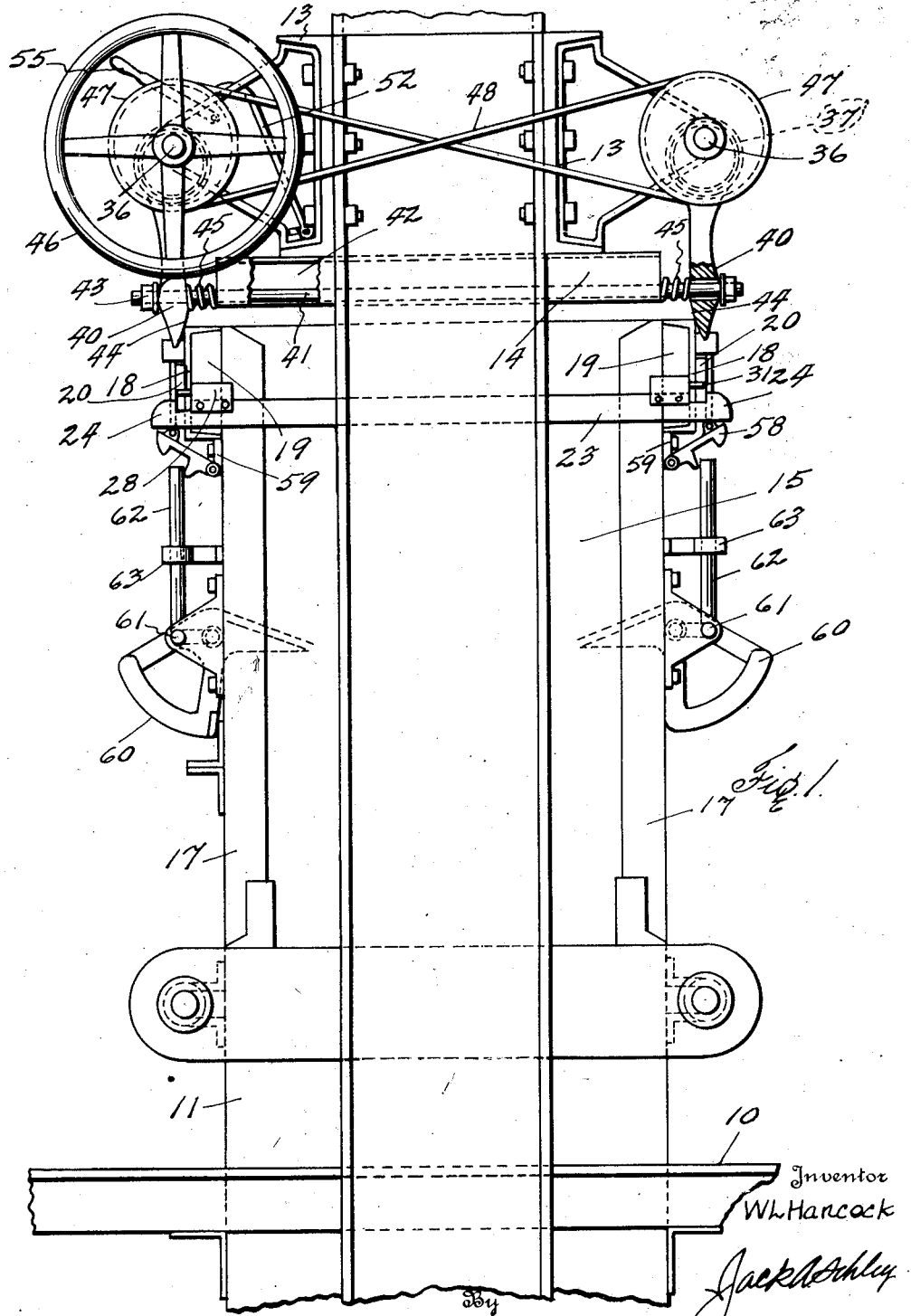
Figure 2:
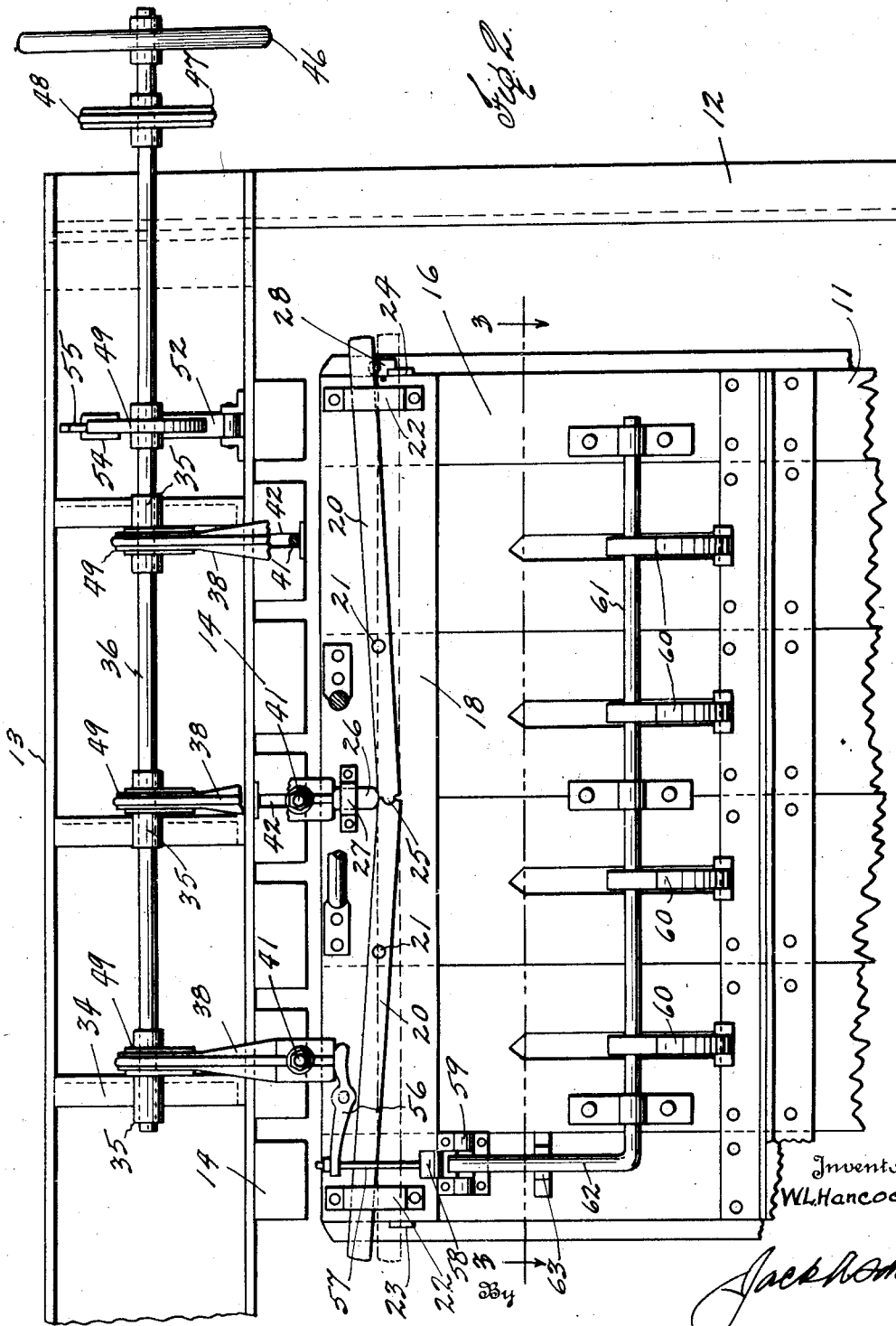
Figure 3:
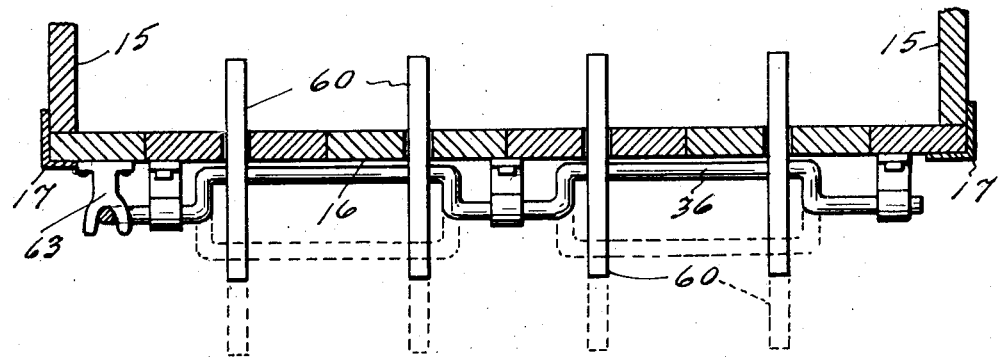
Figure 4:
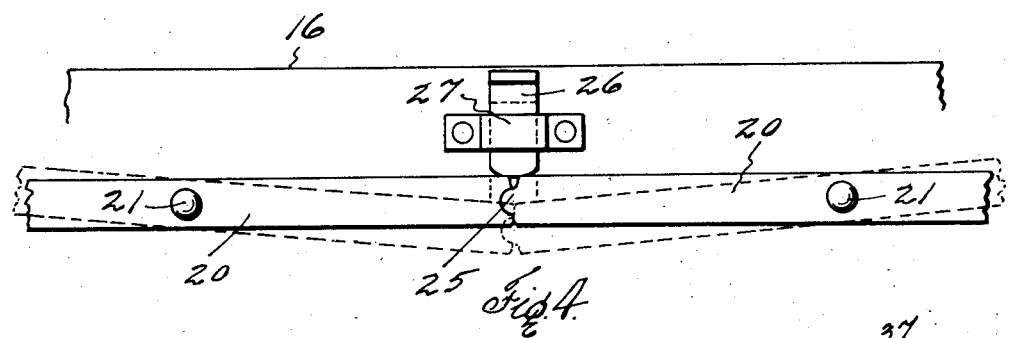
Figures 5, 6, 7, 8:
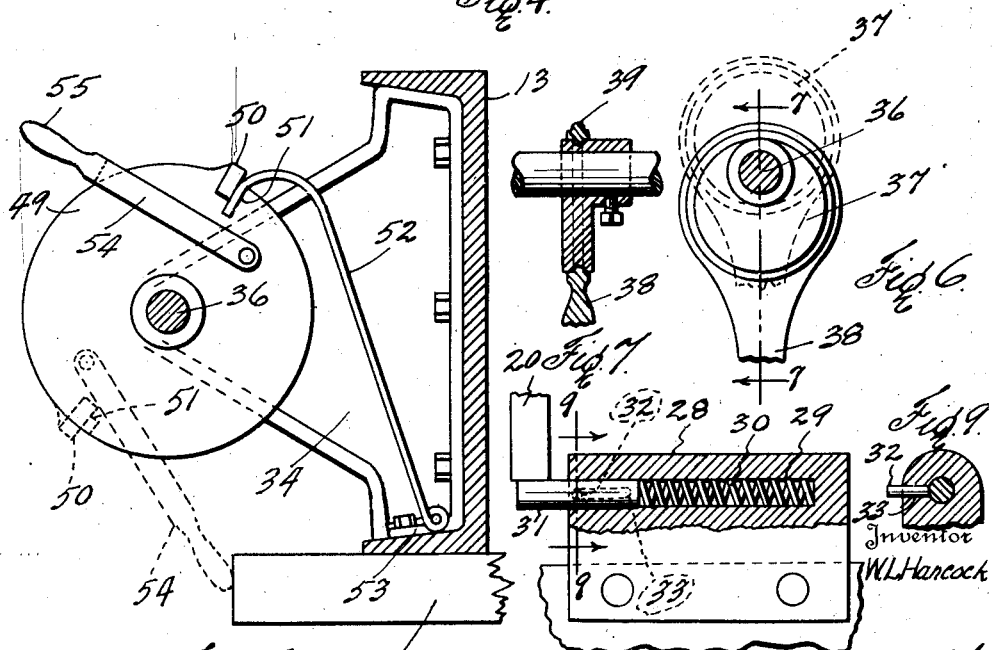

The invention will be more readily understood from a reading of the following specification and by reference to the accompanying drawings, in which an example of the invention is shown and wherein:

Fig. 1 is an elevation of a portion of a cotton press constructed in accordance with the invention, Fig. 2 is a partial side elevation of the same, Fig. 3 is a horizontal cross-sectional view taken on the line 3—3 of Fig. 2, Fig. 4 is a detail of the latch device, Fig. 5 is an enlarged detail of the clamp locking means, Fig. 6 is a detail of one of the clamp eccentrics, Fig. 7 is a vertical sectional view taken on the line 7—7 of Fig. 6, Fig. 8 is a sectional detail of the latch lock, and Fig. 9 is a vertical sectional view taken on the line 9—9 of Fig. 8.

In the drawings the numeral 10 designates the rotatable platform of a cotton press, 11 the press box, 12 one of the frame standards, 13 the channel beams secured to the standard and supporting the top platen members 14, all of which may be of any approved construction.

In the type of cotton press illustrated, the upper portion of the box has end doors 15 and side doors 16 provided at each side edge with channels 17 overlapping the end doors, so that said end doors are restrained from opening when the side doors are closed. The side doors are hinged across their lower ends and suitably counter-balanced, but the details of this will not be described, as the hinging, mounting or particular door structure forms no part of the invention.

It is preferable to mount across the upper end of each side door a transverse stringer 18 in the form of an inverted channel having a wood filler 19 (Fig. 1). This permits lag screws and other fastenings, securable in wood, to be used and provides a metal mounting and wearing surface, as well as bracing and protecting the upper end of the door.

Latch levers 20 are pivoted on stud bolts 21 and extend longitudinally of each stringer. By pivoting said levers nearer their inner ends, their outer ends overbalance. Near its outer end each lever is confined in a keeper 22, wherein it has a limited vertical movement. Latch bars 23 secured to the end doors have their ends projecting and provided with hooks 24 underlying and receiving the outer ends of the latch bars, whereby said doors are latched.

The latch levers are arranged a pair to each side door and the levers of each pair have their inner ends hinged together, as by a knuckle joint 25. A vertically slidable gravity plunger 26 has its lower end resting upon the knuckle joint and is confined in a keeper 27 mounted on the stringer. When the plunger is depressed the latch levers are swung to lift their outer ends from the hook 24.

In order to lock the levers in their elevated position small housings 28 are fastened on each end of one of the latch bars 23. Each housing (Figs. 8 and 9) has a longitudinal bore 29 containing a coiled spring 30 for impelling a plunger bolt 31 slidable in said bore and having a stop pin 32 extending laterally through a slot 33 in the side of the housing.

When the latch levers are in engagement with the hooks 24, the bolts are withdrawn into the housings and the springs compressed, the outer ends of said bolts bearing against said levers. Upon the unlatching of a pair of levers, the bolt is impelled outwardly under the adjacent lever so as to support said lever above the hook 24 as is shown in Figs. 1 and 2. The pin 32 is used to withdraw the bolt and lower the levers. This is an important feature as the latch device is thus locked in its unlatched position.

When the press box is under the tamper (not shown) and when the platform 10 is rotated to bring the box under the platen bars 14, the latch device holds the doors up or closed; and as it is not called upon to do any heavy work, it may be made of light weight material and comparatively inexpensive. However, when the bale is being formed and the ram is in operation, heavy duty fastenings for the doors are necessary.

On each channel beam 13 is mounted a plurality of hanger brackets 34 having bearing boxes 35 at their outer ends in which shafts 36 are journaled. The shaft on each side of the box overhangs the correlated side door 16. A plurality of eccentrics 37 are fastened on each shaft, three being shown, but the number may vary. It is preferable to mount the eccentrics adjacent the boxes 35, as obvious.

Clamp arms 38 are hung from the eccentrics, each arm having a ring 39 at its upper end surrounding one of the eccentrics, so that upon a rotation of the eccentrics by the shaft, said arms will be raised and lowered. The arms have shoes 40 at their lower ends and the shoes on one side of the platen are connected with the shoes on the opposite side by bridle rods 41 extending through vertical slots 42 in the platen bars.

Each rod 41 has its ends penetrating shoes and screw-threaded to receive nuts 43. Coiled springs 45 (Fig. 1) are confined on the rods between the shoes and the ends of the platen bars. Each shoe has an inner cam face 44 for engaging and riding on the upper edge of the stringer channel 18 when the arms are lowered. By this arrangement the top of the box is centered under the platen. Wear of the cam faces and the edges of the stringer channels are compensated by adjusting the nuts 43.

When the arms are raised the shoes 40 are elevated so that their lower ends will be above the bottoms of the platen bars 14, thus being out of the way of the upper edges of the doors when the box is swung by the rotation of the table or when the doors are opened and closed. It is desirable to operate the arms on each side in unison and also to use a single operating element.

On one of the shafts 36 is fastened a hand wheel 46 and on each shaft is fastened a grooved pulley 47. A crossed cable-belt 48 connects the pulleys so that upon a rotation of the hand wheel the pulleys are rotated in opposite directions.

Upon turning the hand wheel 46 in a clockwise direction (Fig. 1), the shafts 36 are rotated to lower the arms 38 so that the shoes engage the stringers 18. With the parts in this position it is desirable to lock the arms against upward displacement. A locking disk 49 is fastened on the hand wheel shaft 36 and has a stop lug 50 (Fig. 5) on its periphery contiguous to a notch 51. A dog 52 pivoted by a bracket 53 to the adjacent beam 13 has its curved end overhanging the disk and forked so as to ride the periphery, abut the lug and drop into the notch.

When the hand wheel 46 is turned in a clockwise direction to rotate the shafts 36 and also to rotate the eccentrics 37 downwardly (Fig. 6) to lower the arms 38, the disk 49 is likewise rotated in a clockwise direction and a lock lever 54 is carried from the position shown in dotted lines in Fig. 5 to the full line position. The lever straddles the disk 49 and is pivoted so as to rest upon the periphery of said disk and under the dog when the latter is engaged in the notch 51.

When the lock is in position, the shafts can not be rotated and the arms 38 can not be displaced upwardly. When it is desired to release the parts the lever 54 is swung upwardly by means of a handle 55 and engages the end of the dog 52, thus raising it from the notch 51. Upon turning the hand wheel 46 in a counter-clockwise direction, the shafts are rotated and the eccentrics with their arms are raised. This causes a rotation of the disk 49 so that the lever 54 is carried downwardly. When the eccentrics have been swung to their extreme upper position the handle 55 will engage one of the platen bars 14 and the lug 50 will abut the lever 54, thus preventing further rotation.

By referring to Fig. 2 it will be seen that the central arm 38 is located to engage and depress the plunger 26 when lowered. One end arm when lowered engages a centrally pivoted tripping lever 56 mounted on the stringer 18 and having pivotal connection at its opposite end with a link 57 suspending a latch hook 58 pivoted upon a bracket 59 mounted on the side door.

On each side door the usual bale dogs 60 are mounted on a crank shaft 61 having a crank lever 62 at one end located so that the upper end of said lever will engage under said hook 58, whereby said shaft and dogs will be held in position. A stop bracket 63 receives the lever 62 in its upright position. This is a safety feature, as the lever can not be swung outwardly by the dogs until it is released.

When the arms 38 are elevated the doors will be fastened by the latch bars 20 and the latch hooks 24 and the lever 62 will be retained by the hook 58. After the box 11 has been rotated with the platform 10 to bring it under the platen bars 14, the operator rotates the hand wheel 46 in a clockwise direction which rotates the shafts 36 and swings the eccentrics downwardly. This causes the arms 38 to be lowered so that the cam faces 44 of the shoes 40 engage and ride on the upper edges of the stringer channels 18.

It is obvious that the shoes will move the box under the platen and center it, if it happens to be slightly out of position. As the arms are lowered the plungers 26 are engaged and depressed, thus raising the latch levers 20 from hooks 24, whereby the spring bolts 31 are released and automatically lock the levers in their elevated position. At the same time the end arms 38 contact with and trip the levers 56, thus raising the hooks 58 and freeing the lever 62.

When the limit of the downward movement or clamping action of the arms is reached, the lug 50 on the rotating disk 49 will abut the end of the dog 52 which will drop into the notch 51 and thus lock the shafts and hand wheel against further rotation. The arms 38 and their shoes 40, together with the bridle rods 41 are heavy enough to stand the lateral stresses and strains sustained by the side doors due to the upward thrust of the ram and the lateral expansion of the bale.

Various changes in the size and shape of the different parts, as well as modifications and alterations, may be made within the scope of the appended claims.

What I claim, is:

1. In a cotton press, the combination with the doors of the press box, of a latch device for holding said doors in closed position, and means for clamping and securing the doors in closed position after the latch device is released.

2. In a cotton press, the combination with the doors of the press box, of a latch device for holding said doors in closed position including releasing means, and means for clamping and securing the doors in closed position engaging and causing the operation of the releasing means of said latch device.

3. In a cotton press, the combination with the doors of the press box, of a latch device carried by the doors for holding the same in closed position, means mounted separately from the doors for engaging and clamping the same in closed position, and means for releasing the latch device.

4. In a cotton press, the combination with the doors of the press box, of a latch device for holding said doors in closed position, means for clamping and securing the doors in closed position, and means for releasing the latch device when the clamping means is engaged with the doors.

5. In a cotton press, the combination with the doors of the press box, of a latch device for holdig said doors in closed position, and clamping means for engaging said doors located to engage the latch device and release the same when clamping said doors.

6. In a cotton press, the combination with the doors of the press box, of a latch device for holding said doors in closed position, means for clamping and securing the doors in closed position, means for releasing the latch device, and means for holding the latch device in its released position when the clamping means is withdrawn.

7. In a cotton press, the combination with the doors of the press box, of a latch device for holding said doors in closed position, dog supporting means including a crank lever, a retaining element for the lever of the dog supporting means, a tripping device connected with the retaining element and mounted on said doors, and clamping members movable into and out of engagement with the doors and located to engage and operate the tripping device and to release the latch device when engaged with the doors.

8. In a cotton press, the combination with the doors of the press box, of means for holding said doors in closed position, and means movable into and out of engagement with said doors for clamping them in closed position.

9. In a cotton press, the combination with the doors of the press box, of means for holding said doors in closed position, means movable into and out of engagement with said doors for clamping them in closed position, and means for locking the clamping means in engagement with the doors.

10. In a cotton press, the combination with the top platen and the doors of the press box, of means on each side of the platen mounted to be lowered into clamping engagement with the side doors of the press box, whereby said box is centered under the platen and said doors are clamped in position, and means for locking the clamping means in engagement with the doors, whereby said clamping means is held against upward displacement.

11. In a cotton press, the combination with the doors of the press box and the press frame, of clamping members supported on each side of the press frame and overhanging the side doors of the press box, means for lowering and raising said members into and out of clamping engagement with the side doors of the press box, and a common operating device connected with the operating means of said members, whereby said members are lowered and raised in unison.

12. In a cotton press, the combination with the doors of the press box and the press frame, of clamping members supported on each side of the press frame and overhanging the side doors of the press box, means for lowering and raising said members into and out of clamping engagement with the side doors of the press box, a common operating device connected with the operating means of said members, whereby said members are lowered and raised in unison, and means for locking the operating means against operation when the members are in clamping engagement with the doors.

13. In a cotton press, the combination with the doors of the press box and the press frame, of a plurality of clamping arms suspended from the frame and overhanging the doors on each side of the press box, means for connecting each arm on one side of the box with a corresponding arm on the other side of the box, and means for lowering said arms into clamping engagement with the side doors of the box and also for raising them clear of the doors of the box.

14. In a cotton press, the combination with the doors of the press box and the press frame, of a plurality of clamping arms suspended from the frame and overhanging the doors on each side of the press box, means for connecting each arm on one side of the box with a corresponding arm on the other side of the box, means for lowering said arms into clamping engagement with the side doors of the box and also for raising them clear of the doors of the box, and a latch device mounted on the doors and including releasing elements mounted in the path of and engaged by certain of the arms when moved downwardly.

15. In a cotton press, the combination with the doors of the press box and the press frame, of a plurality of clamping arms suspended from the frame and overhanging the doors on each side of the press box, means for connecting each arm on one side of the box with a corresponding arm on the other side of the box, means for lowering said arms into clamping engagement with the side doors of the box and also for raising them clear of the doors of the box, and a common operating device connected with the lowering and raising means whereby said arms are lowered and raised in unison.

16. In a cotton press, the combination with the doors of the press box and the press frame, of a plurality of clamping members supported on the press frame and overhanging the side door of the press box, means mounted on the press frame for lowering and raising said members into and out of clamping engagement with the side door of the press box, and a latch device mounted on the side door and including a releasing element mounted in the path of one of the clamping members.

17. In a cotton press, the combination with the doors of the press box and the press frame, of a plurality of clamping members supported on the press frame and overhanging the side door of the press box, means mounted on the press frame for lowering and raising said members into and out of clamping engagement with the side door of the press box, and means for holding the doors of the press box closed when the clamping members are raised.

18. In a cotton press, the combination with the doors of the press box, of latch bars secured to the end doors of the box and having hooks projecting beyond the side doors, a pair of latched levers pivoted on each side door for engaging the hooks of the latch bars at their outer ends and hinged together at their inner ends, and a plunger mounted to engage the hinged ends of the levers for depressing the same and lifting their outer ends from the hooks of the latch bars.

19. In a cotton press, the combination with the doors of the press box, of latch bars secured to the end doors of the box and having hooks projecting beyond the side doors, a pair of latched levers pivoted on each side door for engaging the hooks of the latch bars at their outer ends and hinged together at their inner ends, a plunger mounted to engage the hinged ends of the levers for depressing the same and lifting their outer ends from the hooks of the latch bars, and a spring pressed plunger restrained by one of the latch levers when seated in its hook and released for supporting said lever when the latter is lifted from its hook.

20. In a cotton press, the combination with the doors of the press box and the press frame, of a plurality of clamping arms suspended from the frame and overhanging the doors on each side of said press box, shafts carried by the press frame on each side of the press box, and means on the shafts connected with the arms for raising and lowering said arms upon the rotation of said shafts.

21. In a cotton press, the combination with the doors of the press box and the press frame, of a plurality of clamping arms suspended from the frame and overhanging the doors on each side of said press box, shafts carried by the press frame on each side of the press box, and eccentrics mounted on the shafts and connected with the arms for raising and lowering said arms upon rotation of said shafts.

22. In a cotton press, the combination with the doors of the press box and the press frame, of a plurality of clamping arms suspended from the frame and overhanging the doors on each side of said press box, shafts carried by the press frame on each side of the press box, eccentrics mounted on the shafts and connected with the arms for raising and lowering said arms upon rotation of said shafts, a locking device connected with one of said shafts and the frame for locking the arms in engagement with the box, and a connection between the shafts for rotating the same in unison.

23. In a cotton press, the combination with the doors of the press box and the press frame, of a plurality of clamping arms suspended from the frame and overhanging each side of the press box, means for raising and lowering said arms to engage the side doors of the press box, and bridle connections extending from the arms on one side of the box to the arms on the other side of the box.

24. In a cotton press, the combination with the doors of the press box and the press frame, of metal members extending across the upper ends of the side doors, a plurality of clamping arms suspended from the frame and overhanging the side doors, means for raising and lowering said arms, and shoes provided on the lower ends of the arms, each shoe having a cam face for engaging the metal member of each side door.

25. In a cotton press, the combination with the doors of the press box and the press frame, of metal members extending across the upper ends of the side doors, a plurality of clamping arms suspended from the frame and overhanging the side doors, means for raising and lowering said arms, shoes provided on the lower ends of the arms, each shoe having a cam face for engaging the metal member of each side door, bridle rods connecting the shoes on one side of the box with the shoes on the other side of the box, and means for adjusting said shoes relatively to said rods to compensate the wear of the cam faces and the metal members.

In testimony whereof I affix my signature.

WILLIAM L. HANCOCK.